May 14, 1935.  A. W. CAPS ET AL  2,001,598
PHOTOGRAPHIC COPY CONVEYER
Original Filed Dec. 21, 1931  8 Sheets-Sheet 2
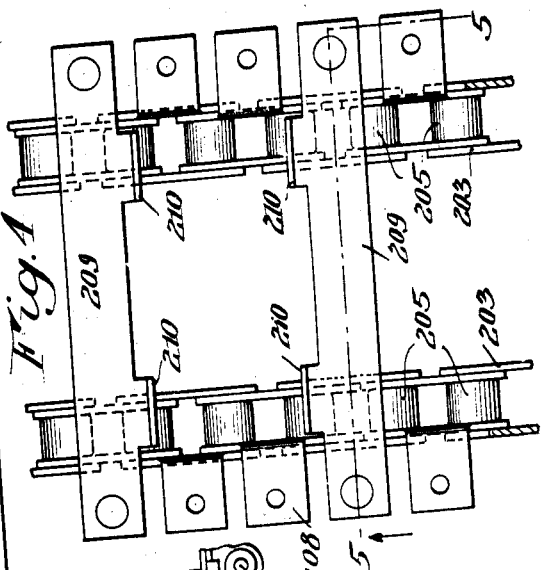
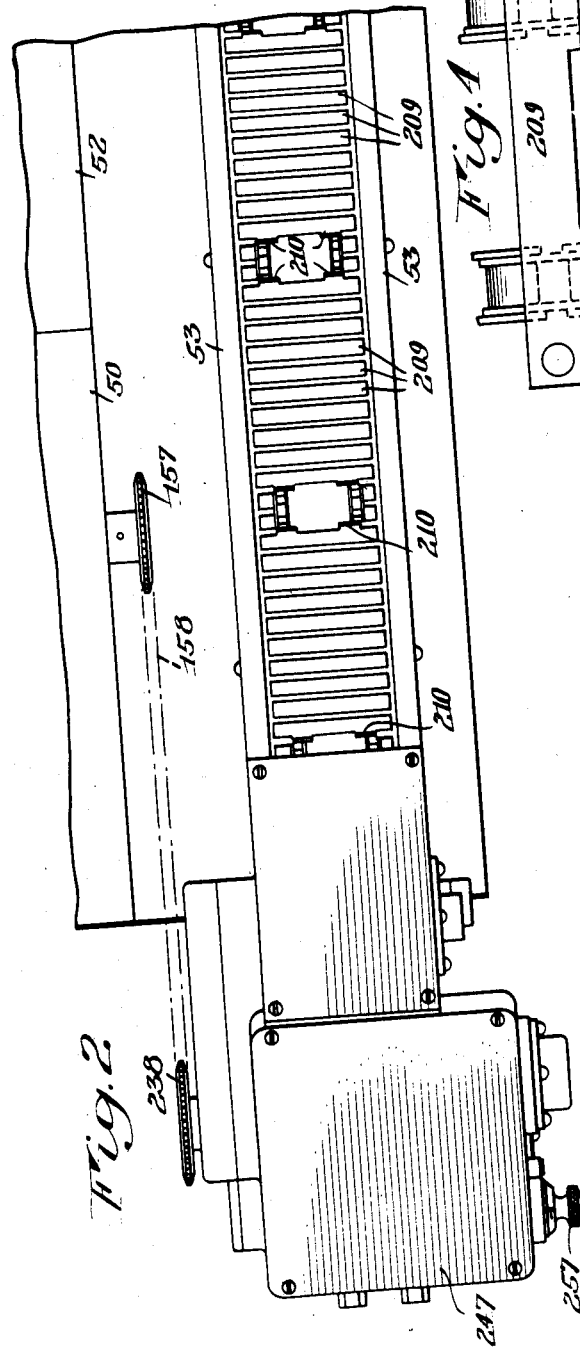
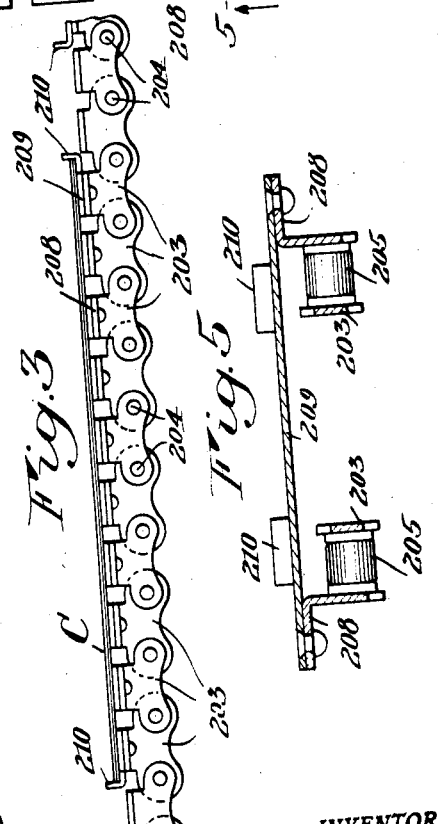
INVENTORS
Arthur W. Caps
Paul Landrock
BY Edward
their ATTORNEY

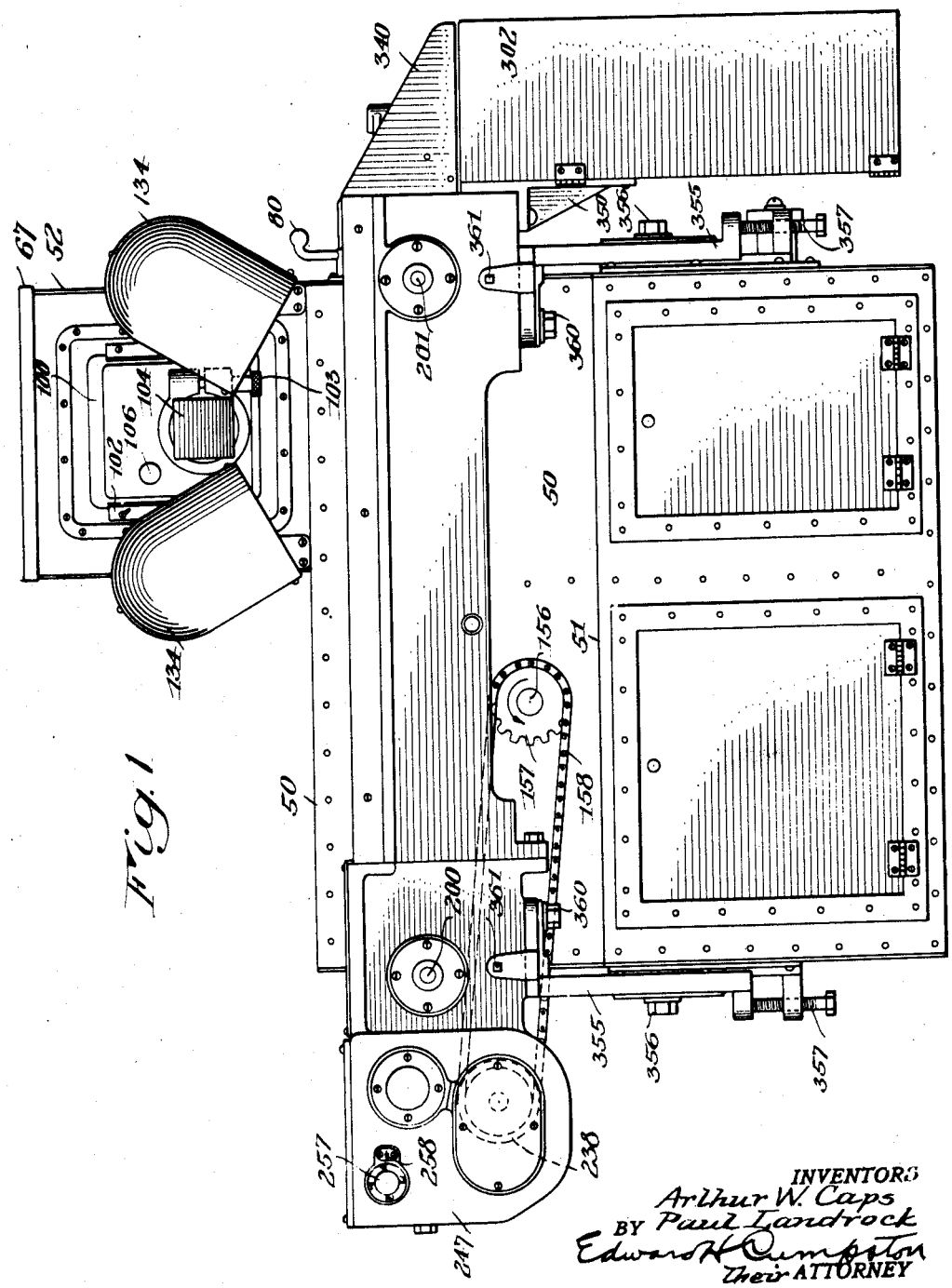

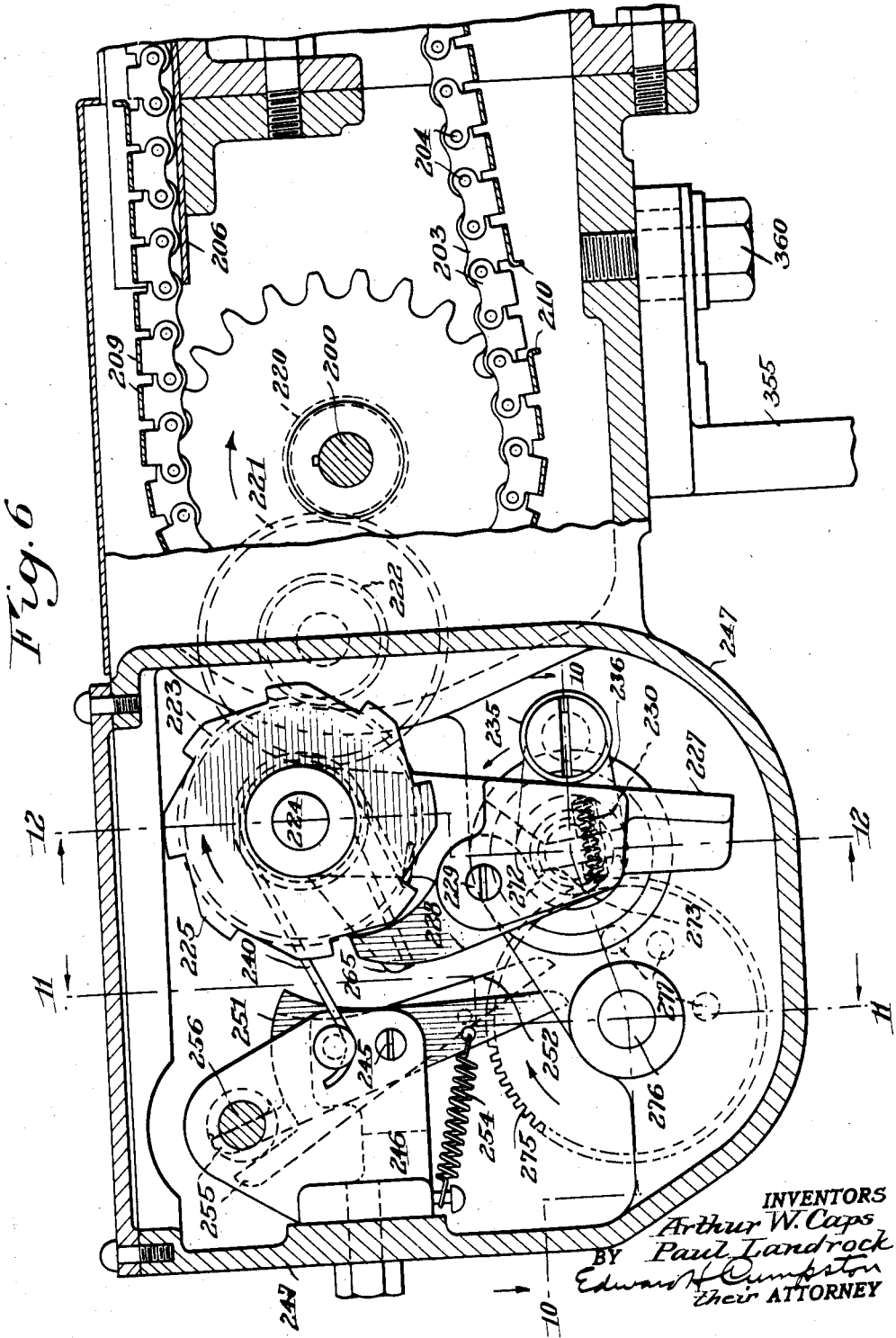

May 14, 1935.  A. W. CAPS ET AL  2,001,598
PHOTOGRAPHIC COPY CONVEYER
Original Filed Dec. 21, 1931  8 Sheets-Sheet 4
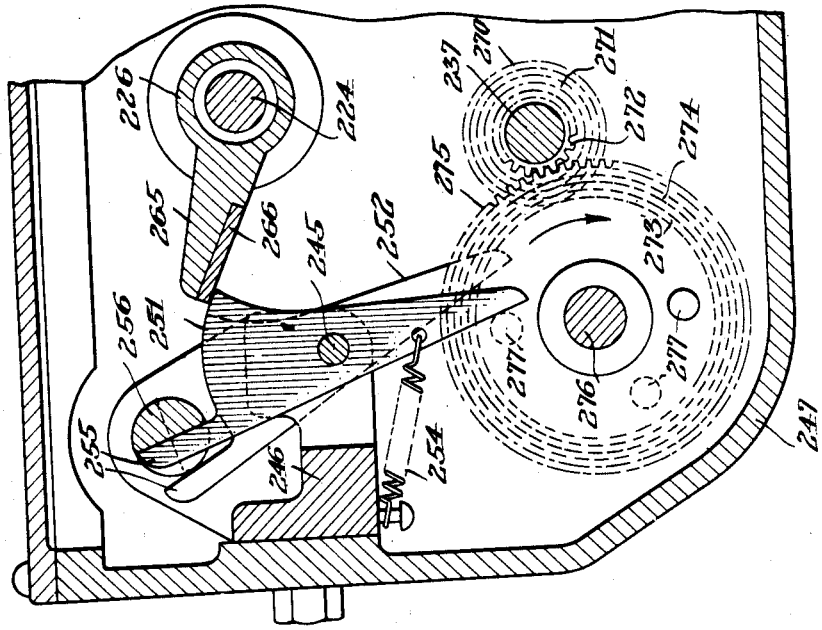
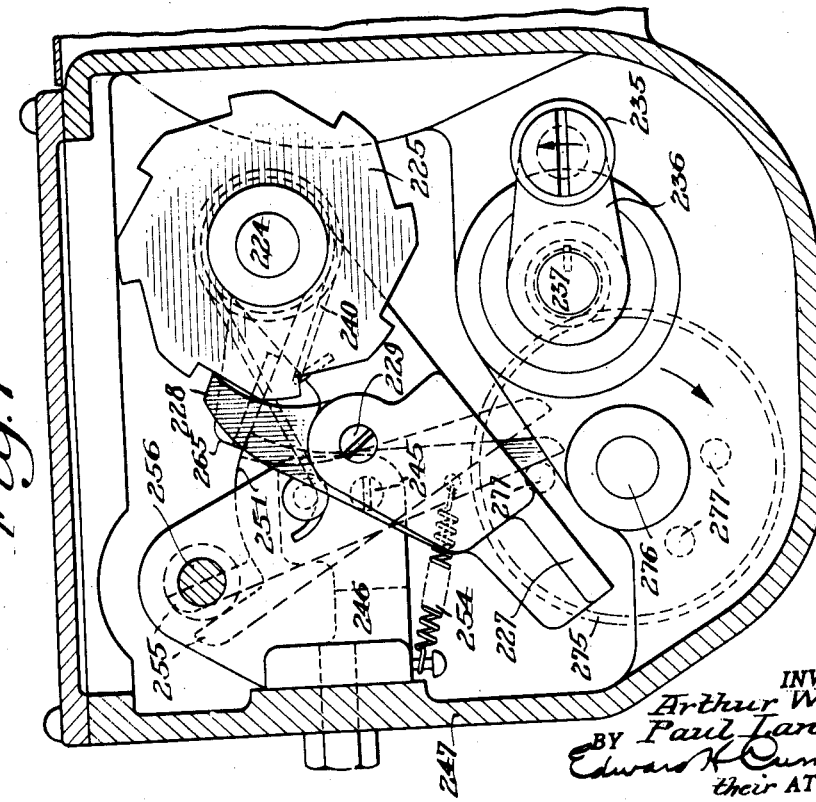
INVENTORS
Arthur W. Caps
Paul Landrock
BY
Edward H. Cumpston
their ATTORNEY INVENTORS
Arthur W. Caps
Paul Landrock
BY Edward L. Dumpston
their ATTORNEY

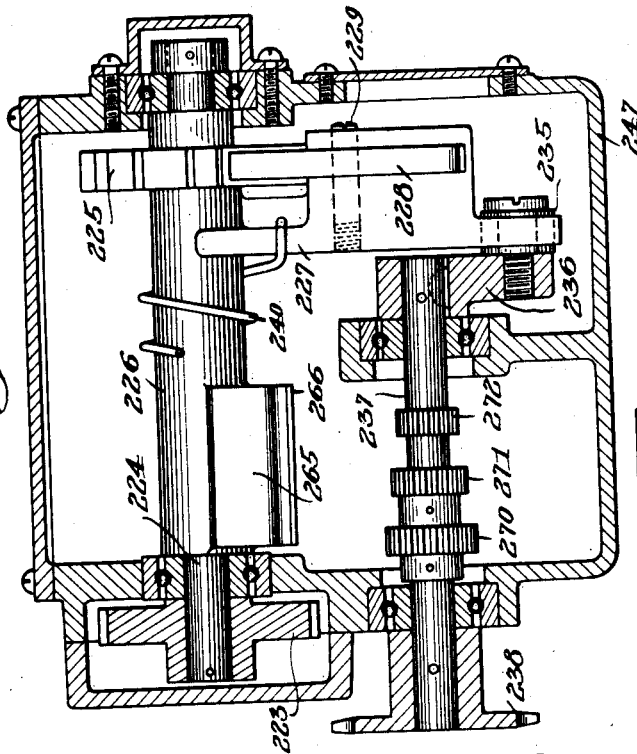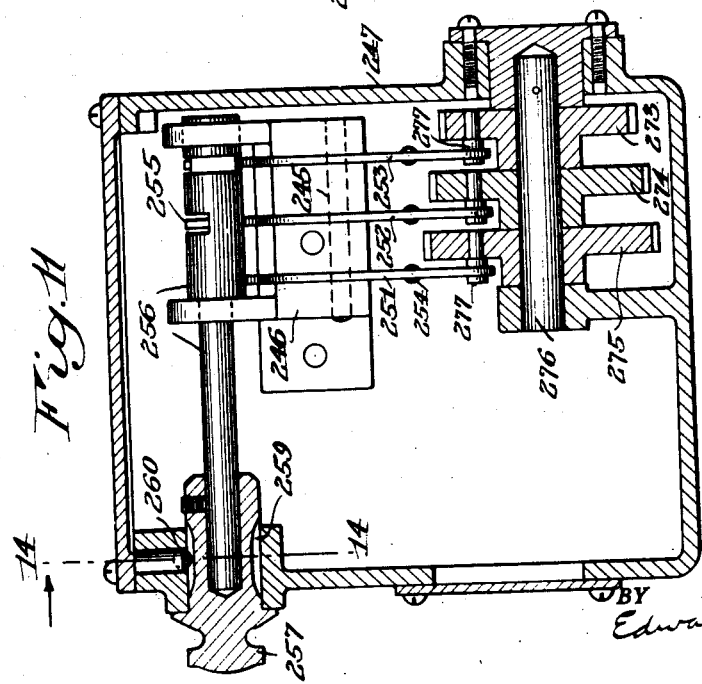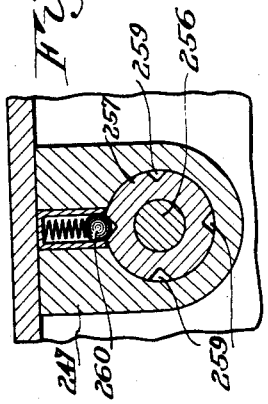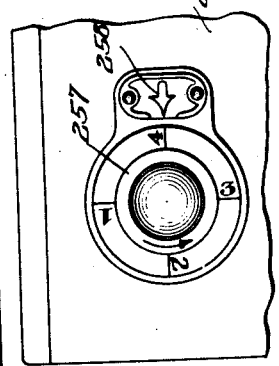

May 14, 1935. A. W. CAPS ET AL 2,001,598
PHOTOGRAPHIC COPY CONVEYER
Original Filed Dec. 21, 1931   8 Sheets-Sheet 8
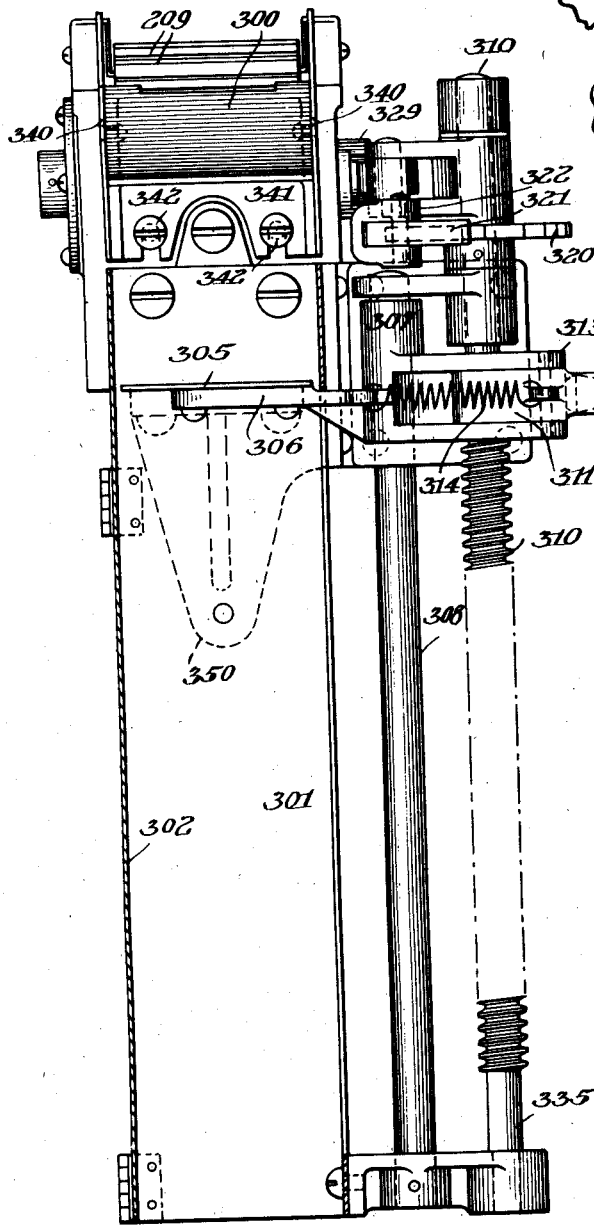
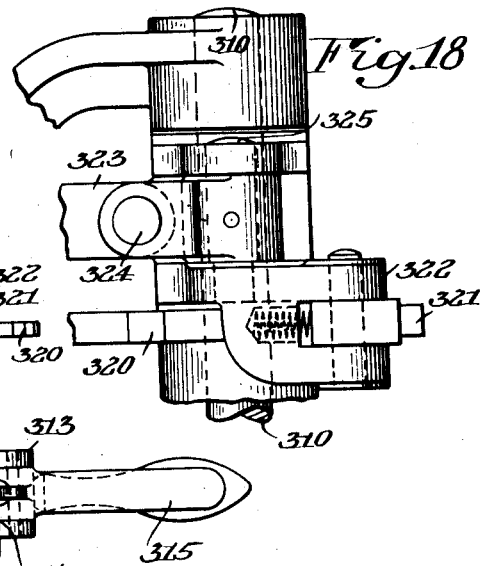
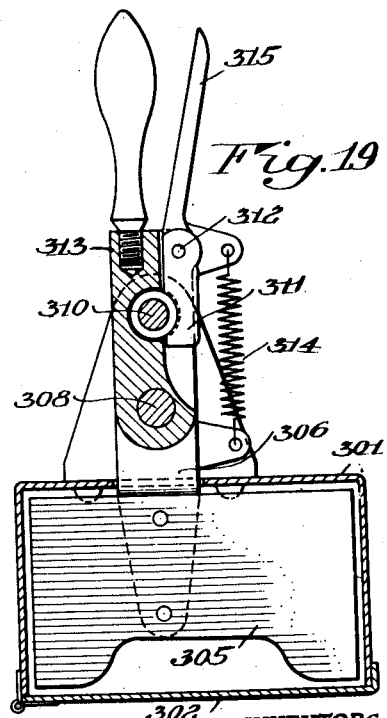
INVENTORS
Arthur W. Caps
Paul Landrock
BY Edward H. Cumpston
their ATTORNEY Patented May 14, 1935

2,001,598

UNITED STATES PATENT OFFICE 2,001,598

PHOTOGRAPHIC COPY CONVEYER

Arthur W. Caps and Paul Landrock, Rochester, N. Y., assignors to Photostat Corporation, Providence, R. I., a corporation of Rhode Island Original application December 21, 1931, Serial No. 582,361. Divided and this application December 15, 1932, Serial No. 647,430

8 Claims. (Cl. 88—24)

This invention relates to a camera, and more particularly to an automatic camera so designed that it will take exposures of successive articles to be photographed, position the articles for exposure, remove them after exposure, and replace the exposed sensitized material by fresh unexposed sensitized material, all automatically and without attention of the operator otherwise than to feed the articles to be exposed to the machine.

An object of the invention is the provision of such a machine which is light, compact, simple to operate, and which is generally improved and more satisfactory than other machines heretofore known.

Another object of the invention is the provision of a machine especially designed and adapted for the rapid reproduction of relatively small forms such as cards and the like.

Still another object is the provision of a machine which will automatically make either one or a plurality of exposures of each article to be photographed, as may be desired.

A further object is the provision of simple and improved means for stacking the cards or other photographed articles after they have been photographed.

A still further object of the invention is the provision of various simplified and improved details of construction, many of which are applicable to various cameras of other types.

To these and other ends the invention resides in certain improvements and combinations of parts, all as will be hereinafter more fully described, the novel features being pointed out in the claims at the end of the specification.

In the drawings:

Fig. 1 is a front elevation of a machine constructed in accordance with a preferred embodiment of the invention;

Fig. 2 is a plan of a part of the machine illustrating especially the copy conveyer;

Fig. 3 is an elevation of a portion of the conveyer by itself, removed from its casing;

Fig. 4 is a plan of a portion of the conveyer on a larger scale;

Fig. 5 is a vertical transverse section through the conveyer substantially on the line 5—5 of Fig. 4;

Fig. 6 is a vertical section through the left hand end of the conveyer illustrating the driving mechanism therefor;

Fig. 7 is a view similar to a portion of Fig. 6 showing the parts in a different position;

Fig. 8 is a vertical section taken substantially on the line 8—8 of Fig. 9, illustrating part of the mechanism shown in Fig. 7, with the parts in the same position as in Fig. 7.

Fig. 11 is a sectional view taken substantially on the line 11—11 of Fig. 6;

Fig. 12 is a sectional view taken substantially on the line 12—12 of Fig. 6;

Fig. 13 is a front elevation of the means for controlling the number of exposures to be taken of each article;

Fig. 14 is a vertical section through a portion of this controlling means, taken substantially on the line 14—14 of Fig. 11;

Fig. 17 is an end elevation of the parts shown in Fig. 15 viewed from the right hand end of the machine, with part of the casing in vertical section;

Fig. 18 is a fragmentary elevation of part of the mechanism shown in Figs. 15 to 17 inclusive illustrating details on a larger scale, and Fig. 19 is a horizontal section through the means for supporting a stack of discharged photographed articles.

The same reference numerals throughout the several views indicate the same parts.

Figure 9:
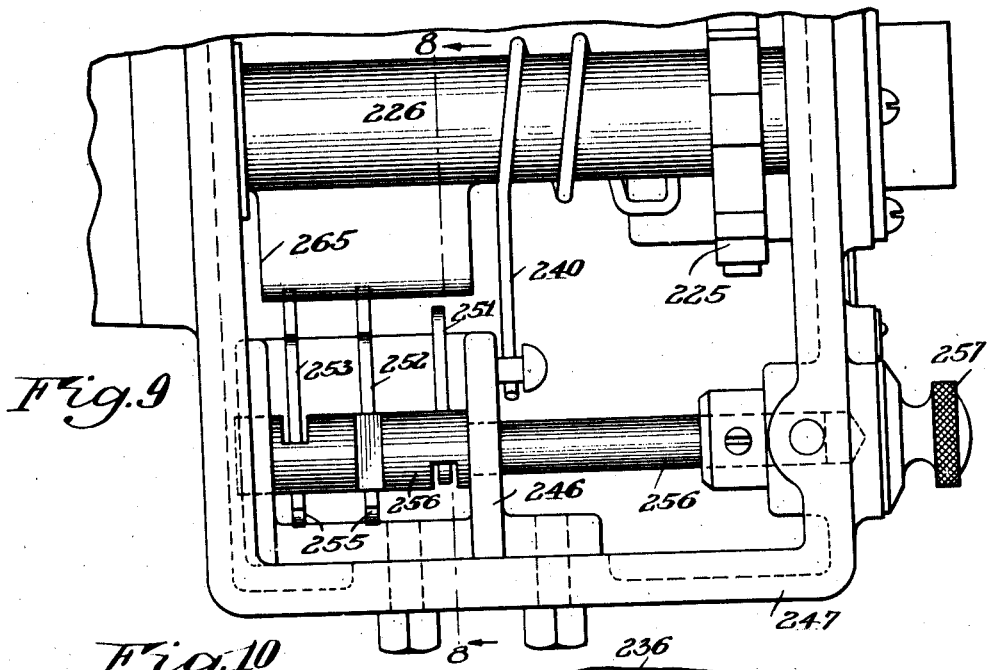
Fig. 9 is a plan of part of the mechanism illustrated in Figs. 6 to 8 inclusive.

This application is a division of the copending application of the same applicants for patent on Camera, Serial No. 582,361, filed December 21, 1931.

Referring now to Fig. 1 of the drawings, the machine comprises a main body or casing 50 having near its bottom a forward extension 51 running substantially the whole length of the casing, and an upward extension 52 near the right hand end of the main casing 50.

The focal plane support, the supply of sensitized material, the shutter, and the lens are mounted either in or upon the casing portion 52, which may be said to constitute the camera proper, and which is not claimed in the present application but is fully disclosed in and forms the subject matter of the aforesaid parent application of which this is a division.

The driving mechanism for the camera is located primarily within the main casing portion 50 and the forward extension 51. Above this extension 51 and mounted thereon is a casing 53 containing a copy conveyer for automatically moving the articles to be photographed into the photographic field of the camera, bringing them to rest in this field while one or more exposures are made, and then removing them from the field. It is this copy conveyer and associated parts which forms the main subject matter of this present divisional application.

The camera casing 52 preferably has a top door 67 which may be opened for access to certain of the interior parts, and has a removable front 100 held in place by the fixed retaining plate 101 and the movable retaining plate 102. On the camera front 100 is mounted a prism 104 held in place by a clamping screw 103, which prism bends the light rays through approximately a right angle as is well understood in the art, so that the camera having a vertical focal plane can photograph articles held horizontally in the photographic field directly beneath the prism 104.

A color filter controlled by the knob 106 may be employed if desired. The subject or article to be copied may be illuminated by any suitable means such as electric lamps within the casings 134.

Suitable driving means preferably within the casing portions 50 or 51 or both, causes constant counter-clockwise rotation of the shaft 156 carrying a sprocket 157 over which runs a chain 158 for driving the copy conveyer. Each complete rotation of the shaft 156 may be described as one complete cycle of operation of the driving means. During a part of each such cycle of operation, the camera shutter is preferably opened automatically to make an exposure, and during another part of each such cycle of operation, while the camera shutter is closed, the sensitized sheet material on which the exposures are made is fed forwardly to remove the exposed portion from the focal plane of the camera and to bring a fresh unexposed portion into the focal plane ready to be exposed at the next opening of the shutter. The mechanism for accomplishing this is fully disclosed in the aforesaid parent application of which this is a division, and forms no part of the subject matter of this present case, although it will be convenient in understanding the conveying mechanism of the present case to know in general that the exposure is made and sensitized material fed at each cycle of operation or rotation of the shaft 156, as above described.

The conveying mechanism itself will now be described, particularly referring at first to Figs. 2 to 6 inclusive and 16. Near each end of the conveyer casing 53 is a cross shaft, the one near the left hand end being designated by the numeral 200 and the one near the right hand end being numbered 201. Each shaft carries a pair of sprockets 202 all of which may be identical in construction. Over these sprockets run a pair of conveyer chains, each made up of individual links 203 pivoted to each other by pivot pins 204. The pivot pins of the links preferably are surrounded by rollers 205. Along the upper stretch or reach of the conveyer, the links slide upon supporting plates 206 so that the upper reach of the conveyer is held perfectly level and in alinement, since it is this reach of the conveyer which holds the articles to be copied while they are being photographed. Each link 203 is provided with a bent over ear or lug 208 extending outwardly substantially horizontally from the links, as shown in Figs. 4 and 5. Cross members or slats 209 extend across the conveyer from one chain to the other and are secured at opposite ends to the ears 208 of the two chains, in any suitable manner, such as by riveting. These slats 209, preferably of metal, form the bed or copy receiving surface on which the articles to be photographed are placed.

The present machine is intended to reproduce photographically a number of articles preferably of the same size, such as a series of record cards, index cards, or the like. Means is therefore preferably provided for guiding or positioning the individual cards or other articles relative to the conveyer so that they will be accurately centered in the photographic field of the camera when the exposure is being made. This means, in the present instance, may comprise lugs 210 bent upwardly from certain of the slats 209 so that they stand above the plane of the slats and form stops or guides against which the articles to be copied may be positioned. When all of the articles are of the same size, such as cards of predetermined dimensions, the lugs 210 may be placed at intervals corresponding to one of the dimensions of the articles. In the specific embodiment illustrated in the drawings, the width of the conveyer is approximately equal to the height of an index card of a certain standard size, while the distance from the pair of lugs on one slat to the next cooperating pair of lugs on another slat is substantially equal to the length of the card, so that the card will fit snugly between the lugs and thus be properly alined and centered on the conveyer. Such a card is indicated at C in Fig. 3.

Preferably there is a slight space between the lugs cooperating with one end of one card and the lugs cooperating with the adjacent end of the next card. For example, as shown in Figs. 2 and 3, the lugs cooperating with the right hand end of the card C are on one link, while the lugs for positioning the adjacent or left hand end of the next card to the right are on the third link beyond the one just mentioned. The intervening two slats are preferably entirely omitted from the conveyer, not only making the conveyer lighter than if they were affixed to the chains, but also providing a space or opening for easy access to certain of the pins holding the links of the chains together, so that the pins can be removed more readily when necessary for replacement or repairs.

The mechanism for driving the conveyer will now be described, referring first to Fig. 6 of the drawings. The shaft 200 near the left hand end of the conveyer is provided with a gear 220 meshing with a larger gear 221 which, in turn, is fixed to a small gear 222 meshing with a larger gear 223. In this way a relatively slight movement of the gear 223 will rotate the shaft 200 to a considerable extent sufficient to carry an exposed article out of the photographic field of the camera and bring a fresh article to be photographed into the photographic field.

The gear 223 is fixed to a shaft 224 (Figs. 6 and 12) which also has fixed thereto a ratchet 225. Rotatably mounted on the shaft 224 is a sleeve 226 having a substantially radial arm 227 to which is secured a pawl 228 pivoted at 229 and urged by a spring 230 into engagement with the ratchet 225. Oscillation of the arm 227 in a clockwise direction, when viewed as in Fig. 6, will therefore result in corresponding clockwise movement of the ratchet 225 and gear 223 and, through the train of gearing previously described, will cause clockwise rotation of the shaft 200 and movement of the copy conveyer in a rightward direction when viewed from the front of the machine as in Figs. 1 and 6. Reverse oscillation of the arm 227 in a leftward direction, however, will not result in any movement of the conveyer, since the pawl 228 will simply slip over the ratchet 225.

For oscillating the arm 227 which carries the pawl 228, there is provided a roller 235 on a crank 236 (see Figs. 6, 10 and 12) which is fixed to a shaft 237 having at its rear end a sprocket 238 over which runs the driving chain 158, shown in Fig. 1 and previously mentioned. Through this chain 158, the constant counter-clockwise rotation of the sprocket 157 is transmitted to the sprocket 238 and this causes constant rotation of the crank 236 in a counter-clockwise direction, when viewed from the front of the machine as in Figs. 1 and 6. During each revolution of the crank the roller 235 thereon contacts with and rolls along the under or right hand side of the arm 227 and thus oscillates the arm in a clockwise direction from the position shown in Fig. 6. During this clockwise oscillation of the arm the pawl 228 thereon engages a tooth of the ratchet 225 to cause corresponding oscillation of this ratchet and of its shaft 224, as above described, so that the conveyer is driven rightwardly through a predetermined distance. Continued movement of the crank 236 permits the arm 227 to oscillate back to its initial position shown in Fig. 6, partly by gravity and partly under the influence of a spring 240 coiled around the sleeve 226, one end of the spring being suitably held at any fixed point and the other end engaging a portion of the arm 227. The parts are preferably so positioned and proportioned that the complete clockwise oscillation of the arm 227 will occur in about one-third of a revolution of the crank 236, and during the remaining two-thirds of the revolution the arm will be returning to its initial position or will remain stationary. Thus the driving of the conveyer will take place only during about one-third of a revolution or cycle of operation, and the camera shutter can remain open, if necessary, for nearly two-thirds of each cycle of operation.

From the foregoing description it is apparent that each revolution of the sprocket 228 and consequent rotation of the crank 236 will cause one complete oscillation of the arm 227 and will drive the ratchet 225 through a distance of one tooth, which will move the conveyer rightwardly through an amount equal to the spacing of the articles to be copied, so that one article which has been photographed will be removed from the photographic field of the camera and the next article will be placed in the field in the proper position to be photographed.

The machine is preferably timed so that the sprocket 238 makes one complete revolution each time that the shaft 156 makes one complete revolution, and during this revolution, as above mentioned, the camera shutter has opened and closed and the sensitized photographic material is fed forwardly. Also during such a revolution, while the shutter is closed and usually while the sensitized material is being fed, the forward intermittent driving of the conveyer takes place. When the sensitized material is stationary and the shutter is opened to make an exposure, the copy conveyer is likewise stationary, since at this time the arm 227 is moving backwardly during the return stroke of its oscillation and the pawl 228 is passing over the ratchet teeth 225.

In this way, the conveyer is moved forwardly one step after each exposure, so that one photograph will be made of each article placed on the conveyer. In some instances, however, it may be desired to take more than one photograph of each article, and the present apparatus is so designed that one or several exposures of each article may be made, as desired.

The mechanism permitting the making of a plurality of exposures of each article may be termed for convenience the duplicating mechanism, and is illustrated in Figs. 6 to 14 inclusive. This duplicating mechanism operates to prevent forward movement of the conveyer at certain times, so that instead of moving the conveyer one step after each exposure, it will be moved only after each two exposures if two copies are to be made of each article, or only after each three exposures if three copies are to be made of each article, and so on. Obviously the mechanism can be designed to make any desired number of exposures of each article, and the present drawings illustrate an embodiment in which two, three, or four exposures of each article can be made automatically, as well as a single exposure.

Referring now especially to Figs. 6 and 8, a cross shaft 245 is held by a suitable bracket 246 secured to the casing 247, which envelops the drive mechanism for the conveyer. On this shaft are pivotally mounted a plurality of latching levers, three being shown in the present instance, which are designated from front to back, respectively, by the numerals 251, 252, and 253. Each of these latching levers extends both above and below its pivot and springs 254, one connected to each lever, tend to pull the bottom ends of these levers leftwardly and move the top ends rightwardly when viewed as in Fig. 6.

Each lever has near its upper left corner an upper extension 255 which may contact with a shaft 256 extending to the front of the casing and provided with an external knob 257, as shown in Figs. 11 and 13. This knob 257 serves as means for rotating the shaft 256 from the exterior of the casing and is provided with graduations, as shown in Fig. 13, which cooperate with a suitable index mark 258 on the casing to indicate the relative position of the knob. A portion of the knob 257 may have a plurality of notches 259 cooperating with a spring pressed detent 260, as shown in Figs. 11 and 14, for frictionally holding the knob in any one of the plurality of positions indicated by the graduations.

In the plane of each of the levers 251, 252, and 253, the shaft 256 has a notch, all the notches being in different relative positions around the shaft. When the shaft 256 is rotated to a predetermined position, one of the notches is brought into cooperation with one of the tails 255 so that this tail may move into the notch, as shown in Fig. 8, and its associated lever may move slightly in a clockwise direction under the influence of its spring 254. At this time, however, all of the other notches will be out of cooperation with the tails 255 on the other levers, so that these tails will all be in contact with the periphery of the shaft 256, and the corresponding levers will be held in a position with their tops slightly leftwardly of the top of the lever which is engaged with the notch. By rotating the shaft 256 to some other position, the tail 255 of the lever in the notch will be forced out of the notch and made to ride on the periphery of the shaft, while another notch may be brought into cooperation with another one of the levers, all as will be explained in greater detail hereafter.

The sleeve 226 which carries the pawl carrying arm 227 has a substantially radial fin 265 (Figs. 8 and 9) having on its bottom a hardened wear plate 266. At each complete oscillation of the arm 227 caused by rotation of the crank 236, the fin 265 is oscillated to a position slightly above the upper right hand corner of the latching levers 251, 252, and 253. When all of the levers are out of the notches in the shaft 256 and engaged with the periphery of this shaft, the upper right hand corners of all these levers are withdrawn so that the fin 265 does not come into contact with them. Whenever the shaft 256 is turned, however, so that one of the levers may enter a notch in the shaft, then the upper end of this lever is slightly farther to the right and the upper right hand corner of the lever is in the path of the fin 265. As the fin oscillates upwardly, under the influence of the crank 236, it will come into contact with this latching lever, momentarily force it back against the action of its spring 254, and slip over the corner of the lever toward the upper end of the oscillation. Then as the crank 236 continues its rotation and the oscillating arm 227 begins its return, the wear plate 266 on the fin 265 will come into contact with the top of the latching lever in substantially the position illustrated in Fig. 8, and the fin will thus be held in this position, maintaining the arm 227 in the position illustrated in Fig. 7 and preventing return movement thereof. Hence the next revolution of the crank 236 will not cause another feeding movement of the conveyer, but will simply contact with the arm 227 and cause a slight ineffective oscillation thereof to lift it a short distance to the upper limit of its stroke and let it fall back only until it is caught once more by the latching lever unless this lever has meanwhile been withdrawn to an unlatching position. In this way, the latching lever is effective to prevent further movement of the conveyer at each rotation of the crank until the latching lever is withdrawn, and it is apparent that a plurality of exposures of the same article will be made by the camera, the number of exposures being equal to the number of rotations of the crank 236 which take place before the latching lever is unlatched.

Figure 10:
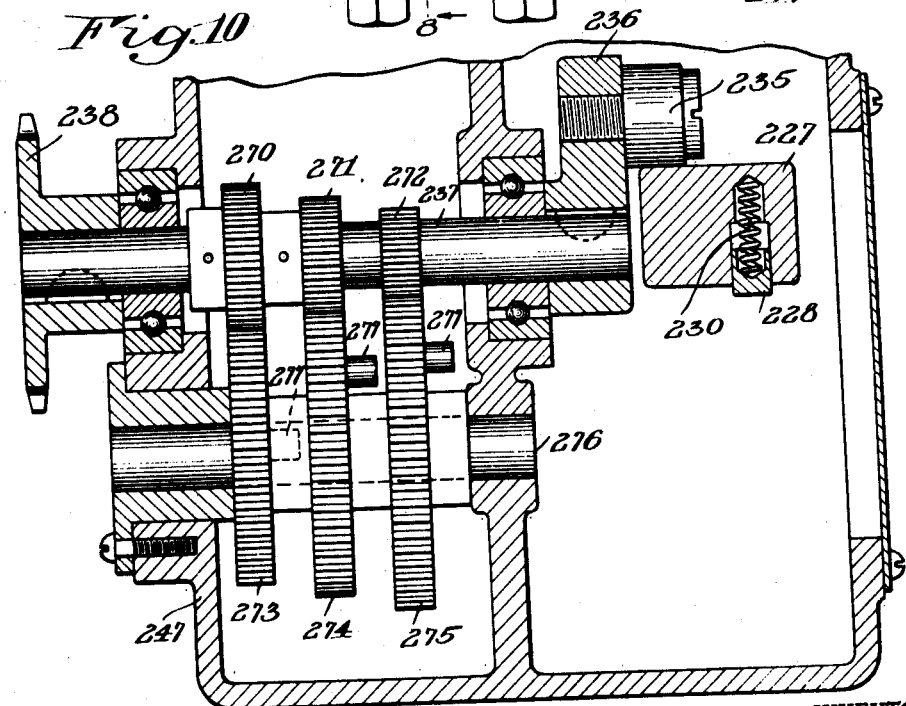
Fig. 10 is a sectional view taken substantially on the line 10—10 of Fig. 6.

For unlatching the latching levers at the desired time so that feeding of the conveyer may be continued after the desired number of exposures have been made, the crank shaft 237 is provided with a series of gears 270, 271, and 272, as seen in Figs. 10 and 12. These gears are all of different sizes, but each is fixed to the shaft 237 to rotate therewith. These gears mesh respectively with gears 273, 274 and 275, each rotatably mounted on a short shaft 276 (Figs. 10 and 11) and each of the gears of this latter set carries a lateral pin 277 in the plane of one of the latching levers for contact with the tail of the lever to unlatch it.

The gear 273 is twice the diameter of the gear 270, so that it will make one revolution for every two revolutions of the crank shaft 227. The gear 274 is three times the diameter of the gear 271 which drives it so that it will make one complete revolution for every three revolutions of the crank shaft. Similarly, the gear 275 is four times the diameter of its driving gear 272 so that it will rotate once for every four revolutions of the crank shaft.

The pin 277 on the gear 273 is arranged to trip the latching lever 253, which will thus be tripped once for every two revolutions of the crank shaft 237. Similarly, the pin 277 on the gear 274 trips the latching lever 252 once for every three revolutions of the crank shaft, while the pin 277 on the gear 275 trips the latching lever 251 once for every four revolutions of the crank shaft.

The notches in the shaft 256 are so placed on the shaft with relation to the graduations shown in Fig. 13 that when the numeral 1 of these graduations is set opposite the index 258, all of the latching levers are riding on the periphery of the shaft 256 in an ineffective position. If the knob 257 be rotated to bring the numeral 2 opposite the index 258, then the lever 253 may enter its notch in the shaft 256 but the other latching levers are still held in an ineffective position on the periphery. Consequently, the first revolution of the crank 236 will oscillate the arm 227 in a clockwise direction to feed the conveyer, but this arm will be latched in an upper position near the end of its forward stroke, as shown in Fig. 7, so that the crank 236 will continue its rotation without a corresponding return movement of the arm 227. Hence, the second revolution of the crank will not cause any feeding of the conveyer because it will not cause any effective oscillation of the arm 227. During the latter part of the second revolution of the crank, however, the pin 277 on the gear 273, which is rotated once for every two revolutions of the crank, will come into contact with the downwardly extending tail of the latching lever 253 and will momentarily move this latching lever to withdraw the upper right hand corner thereof from the fin 265, so that the arm 227 may complete its oscillation and return to the initial position illustrated in Fig. 6. Then the next rotation of the crank 236 will cause one more feeding operation of the conveyer, after which the arm 227 will again be latched by the latching lever, and so on. In this way, two exposures of the same article will be made betwen successive feeding movements of the conveyer.

If the control knob 257 be turned so that the numeral 3 of the graduations is opposite the index 258, then the latching lever 253 is withdrawn from its notch and rides on the periphery of the shaft 256, while the latching lever 252 is permitted to move into its notch, which brings the upper right hand corner of this lever into effective position to latch the fin 265. The first revolution of the crank will then cause a feeding movement of the conveyer but the arm 227 will be latched by the lever 252 so that the second and third revolutions of the crank will not cause effective oscillation of the arm, and consequently will not produce any feeding of the conveyer. Toward the end of the third revolution, however, the pin 277 on the gear 274 will trip the lever 252, permitting the arm 227 to return to initial position, so that the next revolution of the crank will once more cause a feeding movement of the conveyer, after which the arm will once more be latched in an ineffective position. In this way, three exposures of each article will be made by the camera between successive feeding movements of the conveyer.

Similarly, if the numeral 4 of the graduations be brought opposite the index 258, which is the position shown in Fig. 13, then the latching levers 252 and 253 will be withdrawn from their notches in the shaft 256 but the latching lever 251 will be permitted to move into its notch. The operation will be similar to that above described, except that the pin 277 on the gear 275 will not trip the latching lever 251 until the latter part of the fourth revolution of the crank. In this way, four exposures will be made of each article.

Figure 15:
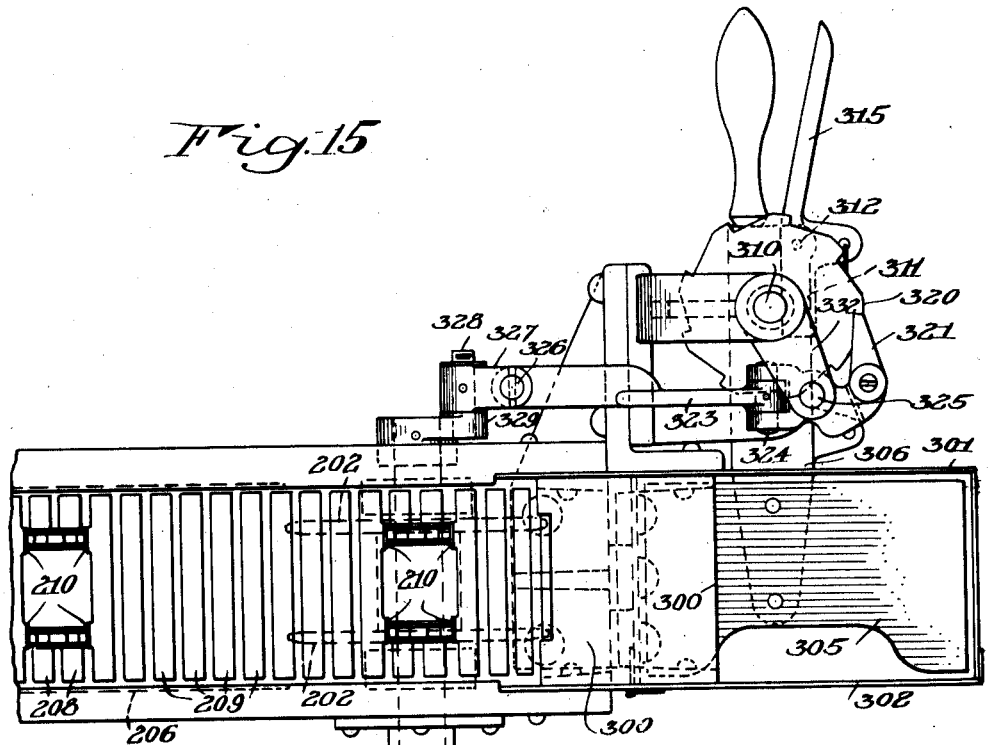
Fig. 15 is a plan of a portion of the copy conveyer near the right hand end of the machine and its associated stacking mechanism.
Figure 16:
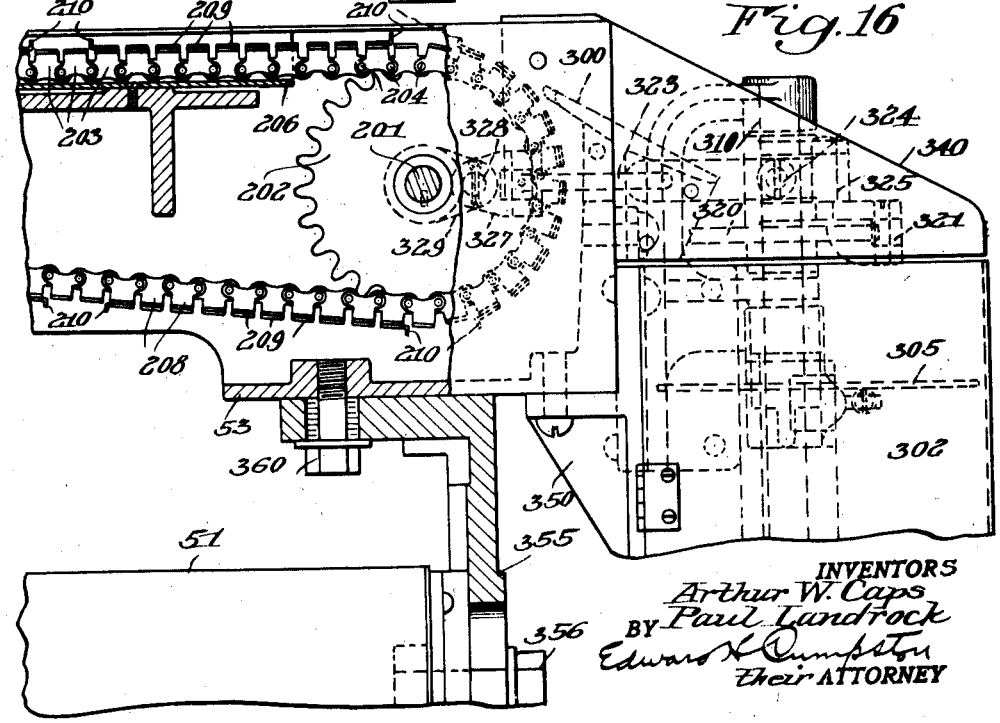
Fig. 16 is a front elevation of the parts shown in Fig. 15 with parts in vertical section.

After the requisite number of exposures of each article have been made, continued feeding movement of the conveyer finally brings each article to a position over the shaft 201 at the right hand end of the conveyer, and as the conveyer begins to pass around the sprockets on this shaft, the article slides off onto a guide plate 300 (Figs. 15 and 16) and slides down this plate and into any suitable receptacle 301. When the articles being photographed are cards, the receptacle 301 is made of proper size to receive these cards loosely, but to confine them sufficiently so that they fall one upon another and will be automatically stacked. The receptacle 301 is provided with a door 302 at the front through which a stack of accumulated cards can be removed.

It is found that if the top of the pile of cards is a substantial distance below the guide plate 300, then the cards do not stack as evenly as if the top of the stack is a relatively short distance below the guide plate. When the card is permitted to fall through a considerable distance, it may twist during such fall so that it may even fall upside down onto the pile or stack of cards. To prevent this, and to insure better and more uniform stacking of the discharged articles, the present invention contemplates the provision of a support for the stack which moves automatically approximately in accordance with the accumulation of articles on the stack, so that the capacity of the receiving stack is great and yet the articles have to fall only a short distance onto the top of the stack.

To this end, the article receiving casing 301 is provided with a bottom or support 305 which is vertically movable, being mounted on a bracket 306 extending into the casing through a slot in the rear wall thereof, which bracket 306 is formed as part of a sleeve 307 (Fig. 17) freely movable vertically on a guide shaft 308. During normal operation of the device, the bottom or support 305 is automatically moved downwardly by a screw 310 with which engages a half nut 311 (Figs. 17 and 19) pivoted at 312 to an extension 313 on the sleeve 307. A spring 314 normally holds the half nut 311 in threaded engagement with the threads of the screw 310. By grasping a handle portion 315 fixed to this half nut, however, it may be moved against the influence of the spring 314 to release it from the threads of the screw 310 so that the support 305 and associated parts may be freely moved up or down, as desired.

Fixed to the screw 310 near its upper end is a ratchet 320 (Fig. 15) arranged to be engaged and operated by a pawl 321 on an arm 322 mounted for oscillation about the axis of the screw 310. This arm 322 is connected to an operating link 323 by a universal joint having pivots 324 and 325 at right angles to each other, and the opposite end of the link 323 is pivoted at 326 to a block 327 mounted on the crank pin 328 of a crank 329 fixed to the conveyer shaft 201. Each time that the conveyer is driven forwardly the shaft 201 will rotate through at least part of a revolution, which will cause corresponding rotation of the crank 329 and, through the link 323, corresponding movement of the pawl 321. The action of the pawl upon the ratchet 320 will gradually rotate the screw 310 in a direction to lower the support 305, and the proportions of the parts are so chosen that the support 305 will move downwardly approximately at the same rate at which the pile or stack of the discharged articles is built up. Hence at the beginning of the operation the support 305 can be placed in a relatively high position so that the cards or other articles photographed will not fall far after sliding off the guide plate 300. Yet the capacity of the stack is not limited by the nearness of the support 305 to the guide plate 300, because as articles accumulate on the stack, the stack as a whole moves downwardly under the influence of the screw 310 and the top of the stack is, therefore, always maintained at approximately the same elevation relative to the guide plate 300, off of which the articles slide.

The screw threads of the screw 310 are cut away near the bottom of the screw, as indicated at 335 in Fig. 17, so that when the support reaches the bottom limit of its movement, no damage to the parts will occur if the operator does not notice this condition. Downward movement of the support 305 will simply stop, and the top of the pile will be built up higher and higher as additional articles are deposited thereon, without any damage whatever to the apparatus.

Above the container 301 is a separate upward extension comprising front and back plates 340 (Figs. 16 and 17) connected to each other by an end plate 341, which is held to the main casing by screws 342 passing through slots in the plate. The guide plate 300 is secured to and supported by these plates 340, and since these plates are separate from the main body of the container 301, they may be easily adjusted simply by loosening the screws 342 whenever it is desired to adjust the guide plate 300 relative to the conveyer.

The container 301 for receiving the articles discharged from the conveyer is carried by a bracket 350 (Fig. 1) from the main conveyer casing 53, while the casing 247 at the left hand end of the conveyer which houses the conveyer operating mechanism, is likewise carried by the main conveyer casing 53. Hence, all of the conveyer mechanism and closely associated parts form a single unit which is bodily movable together. This whole unit or assembly is adjustably mounted relative to the main casing parts 50 and 51, for focusing the camera. Preferably, the conveyer casing 53 is carried by vertical brackets 355 (Fig. 1) secured to the ends of the casing 51 by bolts 356 passing through slots in the brackets so that when the bolts are loosened, the brackets may be adjusted upwardly or downwardly by adjusting screws 357. These brackets 355, in turn, are secured to the conveyer casing 53 by lag screws 360 (Figs. 1 and 16) which pass through relatively large holes in the brackets and screw into the conveyer casing. Hence when these screws 360 are loosened, the conveyer casing may be adjusted through a limited extent forward or backward or sideways as may be desired, due to the size of the holes through which the screws 360 pass. Adjusting screws 361 (Fig. 1) may be provided for assisting the forward and backward adjustment of the conveyer.

By means of the adjustments described immediately above, the conveyer and its driving mechanism and stacking mechanism can all be adjusted together as a unit, vertical adjustment being made, if necessary, to bring the articles on the conveyer accurately into proper focus, while horizontal adjustment may be made so that when the conveyer is in its position of rest, an article held by the guiding lugs 210 will be accurately centered in the photographic field of the camera. If, when the conveyer is at rest, the guiding lugs 210 are not in the proper position on the photographic feed of the camera, this may be corrected and their positions of rest may be properly correlated with the rest of the mechanism, by sliding the gears 221 and 222 longitudinally on their shaft or stud until they are disengaged from the gears 220 and 223, and then moving either the gear 220 or the gear 223 through the necessary part of a revolution relative to the other, after which the gears 221 and 222 may be reengaged.

In operation, the camera is prepared for use by seeing that it has the requisite supply of sensitized photographic material properly placed in operative position in the machine. Before beginning the making of exposures, the operator grasps the handle 315 carrying the threaded half nut so as to disengage it from the screw 310 and lifts upwardly to bring the support 305 for the discharged photographed articles to the upper limit of its motion. The handle 315 is then released so that the spring 314 engages the threads of the member 311 with the threads of the screw 310.

The camera is now ready for the actual taking of exposures. The motor and the illuminating lamps are turned on, and the operator, standing in front of and facing the machine, a little to the left of the camera lens, deposits the cards or other articles to be photographed on the conveyer, one at a time, placing them accurately between the holding lugs 210 so that they are positioned in predetermined relation to the conveyer.

It will be recalled that the conveyer is driven intermittently. During one of its periods of rest one of the articles will be properly positioned immediately below the camera prism in the photographic field of the camera. The camera operating mechanism, at this time, opens the camera shutter so that an exposure is made, and then closes it again. After the shutter is closed, the feeding mechanism is operated to remove the exposed portion of sensitized material from the focal plane and bring a fresh unexposed portion into the focal plane, all as clearly described in the aforesaid parent application Serial No. 582,361.

While this feeding of the sensitized material is taking place, and assuming that the mechanism is set for taking only one exposure of each article, the crank 236 (Fig. 6) turns in a counter-clockwise direction from the position shown in Fig. 6 and the roller 235 on this crank rides along and presses upon the under side of the arm 227 to cause a clockwise oscillation of this arm, so that the pawl 228 on the arm engages the teeth of the ratchet 235 and rotates the ratchet through a distance of one tooth. This rotation of the ratchet, through the gears 223, 222, 221, and 220, advances the conveyer one step so that the article which has just been photographed is removed from the photographic field of the camera, and the next article, which had previously been placed on the conveyer by the operator, is brought into the photographic field.

This feeding movement of the conveyer is completed in a little less than half a revolution of the crank 236, since it is only a clockwise oscillation of the arm 227 which causes movement of the conveyer. The return or counter-clockwise oscillation of the arm to its initial position causes no movement of the conveyer.

At the completion of the conveyer movement and the feeding of the sensitized material, the camera operating mechanism once more opens the shutter so that another exposure is made. Then when the shutter closes, the sensitized material is once more fed and the conveyer once more moves forwardly to carry the photographed article out of the field of the camera and to bring another article into the field.

If it is desired, however, to take more than one exposure of each article, the control knob 257 (Figs. 11 and 13) is accordingly adjusted for either two, three, or four exposures of each article, with the result that the duplicating mechanism comes into play and the conveyer is moved forward only one step for every two, three, or four exposures, as the case may be, instead of one step for each exposure. The operation of this duplicating mechanism has been so completely described in connection with the description of the parts of the duplicating mechanism that it is believed to be unnecessary to repeat it at this point.

After the articles have been photographed, continued movement of the conveyer brings the articles successively to the right hand end of the conveyer, from which they slide off onto the guide plate 300 and thence onto the support 305, on which the articles gradually accumulate in the form of a stack. As the stack grows in height, the bottom or support 305 automatically moves downwardly because of the rotation of the screw 310 caused by the action of the pawl 321 on the ratchet 320. Thus the top of the stack is maintained at approximately the same elevation, so that the cards or other articles have only a relatively short distance to fall and do not become overturned or twisted during their fall.

When the support 305 for the photographed articles has moved to the bottom of the container 301, the front door 302 on this container may be opened and the stack of photographed articles may be removed, the support 305 then being shifted upwardly to its initial position ready for another trip downwardly.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. Photographic apparatus comprising a copy conveyer for moving articles with relation to the photographic field of a camera, movable operating means, mechanism for driving said conveyer from said operating means, a plurality of different holding means for rendering said driving mechanism temporarily ineffective to drive said conveyer notwithstanding continued movement of said operating means, and means for automatically rendering each of said different holding means ineffective after a different extent of movement of said operating means.

2. Photographic apparatus comprising a copy conveyer for moving articles with relation to the photographic field of a camera, rotatable crank means, mechanism including an arm engageable by said crank means for driving said conveyer, a plurality of different means for holding said arm in an ineffective position relative to said crank means during a predetermined number of rotations thereof, and means for rendering any selected one of said different holding means effective or ineffective at will.

3. Photographic apparatus comprising a copy conveyer for moving articles with relation to the photographic field of a camera, a driving arm for operating said conveyer, operating means for acting upon said driving arm to operate said conveyer, a plurality of different latching means for holding said driving arm out of cooperative relation to said operating means, and means for rendering any selected one of said latching means effective or ineffective at will.

4. Photographic apparatus comprising a copy conveyer, a driving arm mounted for oscillation, a pawl mounted on said arm, a ratchet operatively connected to said conveyer and engaged by said pawl to drive said conveyer, rotary crank means for oscillating said arm once for each complete revolution, latching means for holding said arm against effective oscillation, and means for releasing said latching means to permit effective oscillation of said arm after a predetermined number of cycles of said cyclic oscillating means.

5. Photographic apparatus comprising a copy conveyer, a driving arm mounted for oscillation, a pawl mounted on said arm, a ratchet operatively connected to said conveyer and engaged by said pawl to drive said conveyer, means operable repeatedly through a predetermined cycle for oscillating said arm, a plurality of latching means for holding said arm against effective oscillation, means for moving any selected one of said latching means into the path of travel of said arm to be effective thereon, and means for automatically releasing said effective latching means to permit effective oscillation of said arm after a predetermined number of cycles of said cyclic oscillating means.

6. Photographic apparatus comprising a copy conveyer, a driving arm mounted for oscillation, a pawl mounted on said arm, a ratchet operatively connected to said conveyer and engaged by said pawl to drive said conveyer, means operable repeatedly through a predetermined cycle for oscillating said arm, a plurality of selectively operable latching means for holding said arm against effective oscillation, and means operating in timed relation with said cyclic means for releasing each of said latching means after a different number of cycles of operation of said cyclic means.

7. Photographic apparatus comprising a copy conveyer, a ratchet operatively connected to said conveyer, an arm mounted for oscillation, a pawl mounted on said arm for engaging said ratchet, rotatable crank means for engaging and oscillating said arm to drive said conveyer, latching means for holding said arm in an ineffective substantially non-oscillating position, and means rotatable with said crank means but at a different rate therefrom for releasing said latching means so that said arm may be again oscillated by said crank means.

8. Photographic apparatus comprising a copy conveyer, a ratchet operatively connected to said conveyer, an arm mounted for oscillation, a pawl mounted on said arm for engaging said ratchet, rotatable crank means for engaging and oscillating said arm to drive said conveyer, a plurality of latching levers, means for selectively positioning any desired one of said latching levers in position to engage said arm during an oscillation thereof and hold it substantially against further oscillation, a plurality of gears, one for each lever, operatively connected to rotate with said crank means but at a different rate therefrom and from each other, and means on each of said gears for tripping one of said latching levers.

ARTHUR W. CAPS.
PAUL LANDROCK.